(12) United States Patent
Chang et al.

(10) Patent No.: US 8,666,445 B2
(45) Date of Patent: Mar. 4, 2014

(54) APPARATUS, SYSTEM, AND METHOD FOR TRANSMISSION ANTENNA SWITCHING IN A PORTABLE COMMUNICATION DEVICE

(75) Inventors: Henry Chang, San Diego, CA (US);
Doug Dunn, Chula Vista, CA (US);
Gregory Poilasne, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 1651 days.

(21) Appl. No.: 11/257,725

(22) Filed: Oct. 25, 2005

(65) Prior Publication Data
US 2007/0093282 A1    Apr. 26, 2007

(51) Int. Cl.
*H04M 1/00* (2006.01)
*H04B 7/185* (2006.01)

(52) U.S. Cl.
USPC ............... 455/553.1; 455/13.3; 455/562.1; 455/575.7

(58) Field of Classification Search
USPC ............ 455/66.1, 552.1, 562.1, 101, 277.1, 455/13.3, 553.1; 370/323
See application file for complete search history.

(56) References Cited

U.S. PATENT DOCUMENTS

| | | | |
|---|---|---|---|
| 6,115,367 A * | 9/2000 | Archambaud et al. | 370/334 |
| 6,226,507 B1 * | 5/2001 | Ramesh et al. | 455/277.1 |
| 6,459,689 B1 | 10/2002 | Czaja et al. | |
| 6,697,642 B1 * | 2/2004 | Thomas | 455/562.1 |
| 2001/0039198 A1 * | 11/2001 | Onishi et al. | 455/562 |
| 2002/0118783 A1 | 8/2002 | Cripps et al. | |
| 2002/0172308 A1 | 11/2002 | Harel et al. | |
| 2003/0002594 A1 | 1/2003 | Harel et al. | |
| 2003/0128670 A1 * | 7/2003 | Pinier et al. | 370/252 |
| 2003/0186726 A1 * | 10/2003 | Akita | 455/562.1 |
| 2004/0092235 A1 | 5/2004 | Li et al. | |
| 2004/0121740 A1 * | 6/2004 | Miyano | 455/101 |
| 2004/0125899 A1 | 7/2004 | Li et al. | |
| 2004/0190472 A1 | 9/2004 | Dunn et al. | |
| 2004/0214607 A1 * | 10/2004 | Namiki | 455/562.1 |
| 2006/0040707 A1 * | 2/2006 | Kish et al. | 455/562.1 |
| 2008/0214243 A1 * | 9/2008 | Forrester | 455/562.1 |

FOREIGN PATENT DOCUMENTS

| | | |
|---|---|---|
| JP | 10-285056 | 10/1998 |
| JP | 2004-363863 | 12/2004 |
| WO | WO 01/71940 | 9/2001 |
| WO | WO 02/099999 | 12/2002 |

OTHER PUBLICATIONS http://en.wikipedia.org/wiki/Enhanced_Full_Rate.*

* cited by examiner

*Primary Examiner* — Huy C Ho

(57) ABSTRACT

An apparatus, system, and method manage a transmission antenna system by measuring an antenna performance indicator of an alternate antenna configuration during a reduced data rate transmission. After an antenna performance indicator is measured in a current (first) antenna system configuration, the antenna system is configured to an alternate (second) configuration during a reduced data rate transmission and the antenna performance indicator of the alternate (second) configuration is measured. The antenna performance indicators for both configurations are evaluated to determine the optimum antenna system configuration for transmission. If the alternate (second) configuration will result in decreased performance, the antenna system is changed back to the first antenna system configuration. Otherwise, the alternate (second) configuration is defined as the current configuration and the first antenna configuration is evaluated during reduced rate transmissions.

22 Claims, 3 Drawing Sheets

APPARATUS, SYSTEM, AND METHOD FOR TRANSMISSION ANTENNA SWITCHING IN A PORTABLE COMMUNICATION DEVICE

FIELD OF THE INVENTION

The invention relates in general to antenna switching and more specifically to an apparatus, system, and method for transmission antenna switching in a portable communication device.

BACKGROUND OF THE INVENTION

Diversity antenna systems include two or more antennas where multiple antennas may be used simultaneously or where a particular antenna is selected using switches. Although diversity antennas are used for receive diversity in portable communication devices, conventional devices do not efficiently select an optimum antenna for transmission. As a result transmissions from conventional portable communication devices having multiple antennas are limited in efficiency.

Accordingly, there is a need for an apparatus, system, and method for transmission antenna switching management in a portable communication device.

SUMMARY OF THE INVENTION

A transmission antenna system is managed by selecting a preferred antenna system configuration from a plurality of antenna system configurations based on a first antenna performance indicator and based on a second antenna performance indicator measured during a reduced data rate transmission. After measuring a first antenna performance indicator in a first antenna system configuration, the antenna system is reconfigured to a second configuration during a reduced data rate transmission and a second antenna performance indicator of the second configuration is measured. The antenna performance indicators for both configurations are evaluated to determine the optimum configuration for transmission. If the second configuration will result in decreased performance, the antenna system is changed back to the first configuration. Otherwise, transmission continues using the second antenna configuration and the evaluation of the first antenna configuration is performed during a reduced rate transmission.

DETAILED DESCRIPTION

Figure 1:
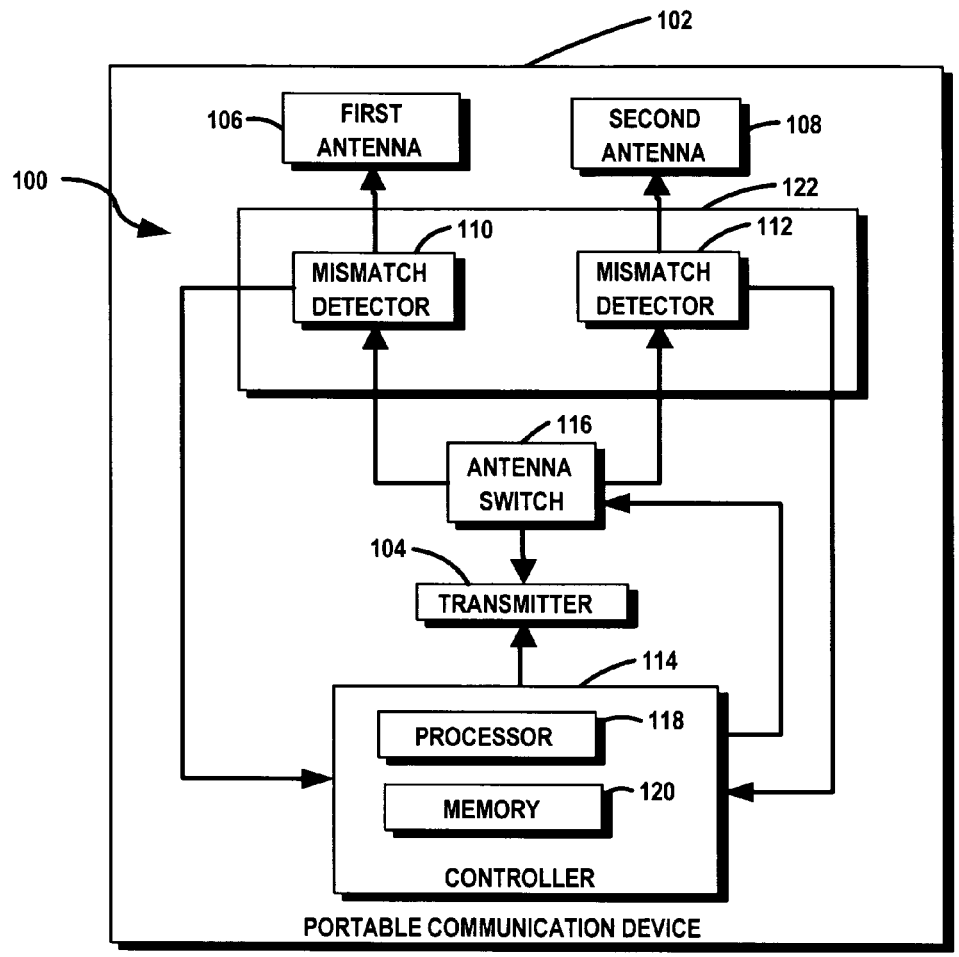
FIG. 1 is a block diagram of an antenna system within a portable communication device in accordance with an exemplary embodiment of the invention.

FIG. 1 is a block diagram of an antenna system 100 within a portable communication device 102 in accordance with an exemplary embodiment of the invention. The portable communication device 102 includes a transmitter 104 and receiver (not shown) connected to the antenna system 100 and is configured to wirelessly communicate with a communication system through the antennas 106, 108. Data and control signals are transmitted by the portable communication device 102 by transmitting electromagnetic signals through the antenna system 100. In the exemplary embodiment, the same antennas (106, 108) can be used for transmitting and receiving signals. In some circumstances, only one of the antennas 106, 108 may be used for reception. Also, one or more dedicated receive antennas may be used for receiving signals in some circumstances. In the exemplary embodiment, the antenna system 100 includes a first antenna 106, a second antenna 108, an antenna performance detector 122, an antenna switch 116 and a controller 114. The antenna system 100 may include other components such as filters and tuning elements, for example. The antenna system 100 can be configured in at least two configurations where, in the exemplary embodiment, the two configurations include a first configuration where a first antenna 106 is connected to the transmitter 104 and a second configuration where a second antenna 108 is connected to the transmitter 104. The configurations may include connections other than connections to a single antenna for each configuration. In some circumstances, for example, the configuration may include connecting multiple antennas.

The antenna system 100 may be implemented within any of numerous types of devices and wireless communication systems where electromagnetic signals are exchanged through an antenna system 100. In the exemplary embodiment, the antenna system 100 is part of a portable communication device 102 operable in accordance with Code Division Multiple Access (CDMA) standards such as CDMA2000, 1xEV-DO, OFDM based standards, and W-CDMA. The portable communication device 102 may be a cellular telephone, wireless modem, personal digital assistant (PDA) or other device that exchanges electromagnetic signals with a fixed or portable communication device. In the exemplary embodiment, the portable communication device 102 includes other hardware, software, and firmware not shown in FIG. 1 for facilitating and performing the functions of a portable communication device 102. For example, the portable communication device 102 includes input and output devices such as keypads, displays, microphones and speakers. Further, the functions and operations of the blocks described in FIG. 1 may be implemented in any number of devices, circuits, or elements. Two or more of the functional blocks may be integrated in a single device and the functions described as performed in any single device may be implemented over several devices. For example, the two mismatch detectors 110, 112 may be implemented as a single mismatch detector connected between the antenna switch 116 and the transmitter 104 in some circumstances.

The antenna system 100 includes at least the first antenna 106, the second antenna 108, an antenna performance detector 122, and a controller 114. In the exemplary embodiment, the antenna performance detector 122 includes two mismatch detectors 110, 112, that provide information regarding the impedance of each of the antennas 106, 108. Each of the antennas 106, 108 may be any dipole, patch, Planar Inverted "F" (PIFA), inverted F, monopole, balanced antennas, or stubby antenna that can exchange signals with the communication system. The particular antenna type of each antenna 106, 108 is selected based on the operating frequencies and bandwidth, power levels used by the portable communication device 102, and in accordance with other design parameters such as efficiency, size, impedance, durability, gain, polarization, cost and weight. Each antenna 106, 108 may include a radiator element and a counterpoise formed by a ground plane in the portable communication device 102. The antennas 106, 108 may be different types of antennas in some circumstances. For example, the first antenna 106 may be an external or extendable antenna and the second antenna 108 may be an internal PIFA.

The antenna performance detector 122 provides information corresponding to the performance of the antennas 106, 108 such as an antenna performance indicator. The antenna performance indicator may be any information that directly or indirectly measures or indicates the performance of the antenna. In the exemplary embodiment, the antenna performance indicator is the reflection coefficient measured at the input of the antenna 106, 108. The antenna performance detector 122 includes two mismatch detectors 110, 112 in the exemplary embodiment. Each mismatch detector 110, 112 provides information regarding the impedance at the input of the corresponding antenna 106, 108. Each mismatch detector 110, 112 indicates the quality of the impedance match of each antenna 106, 108 to the front-end of the transmitter 104. Each mismatch detector 110, 112 includes any combination of circuitry and devices that produces one or more mismatch detector signals that can be used by the controller 114 to determine the return loss or impedance at the input of the corresponding antenna 106, 108. Examples of suitable mismatch detectors 110, 112 are discussed in U.S. patent application Ser. No. 10/806,763, entitled "Systems And Methods For Controlling Output Power In A Communication Device", filed Mar. 22, 2004 and incorporated by reference in its entirety herein. Examples of mismatch detectors 110, 112 that provide return loss information include mismatch detectors formed with circulators and power detectors where two analog signals are produced. One of the signals is an input power signal indicating the input power level at the input of an antenna 106, 108 and the other signal is a reflected power signal indicating the reflected power due to a mismatch in impedance between the antenna 106, 108 inputs and the antenna switch 116. Based on the two signals, the controller 114 determines the reflection coefficient (p). As is known, voltages of signals can be measured to determine a voltage standing wave ratio (VSWR) which indicates return loss and a reflection coefficient ($\rho$). Therefore, the first mismatch detector 110 measures a first reflection coefficient at the first input of the first antenna 106 and the second mismatch detector 112 measures a second reflection coefficient at the second input of the second antenna 108.

The controller 114 is any device, circuit, integrated circuit (IC), application specific IC (ASIC), or other configuration including any combination of hardware, software and/or firmware that performs the functions described herein as well as facilitating the overall functionality of the mobile communication device 102. In the exemplary embodiment, the controller 114 includes a processor 118 and a memory 120. The processor 118 is any computer, processor, microprocessor, or processor arrangement that executes software code to perform the measurement, calculation, and control functions described herein. The memory 120 is any memory device, IC, or memory medium suitable for storing code and data that can be accessed by the processor 118. The controller 114 may include other devices, circuits and elements not shown in FIG. 1 that facilitate the exchange of signals and perform other interface functions. For example, the controller 114 includes analog to digital (A/D) converters in some circumstances for sampling and converting the analog signals received at the controller 114. Also, the controller 114 includes digital to analog (D/A) converters to provide analog control signals to the antenna switch 116 in some circumstances.

During operation of the portable communication device 102, the optimum antenna configuration for transmission may change due to the orientation of the portable communication device, the relative loading on the antenna system due to the user, the immediate environment and the changes in the location of the communication device 102 within a cell. Accordingly, optimum transmission efficiency and performance is achieved by selecting the optimum antenna configuration for transmission.

In accordance with the exemplary embodiment, the controller 114 changes the configuration of the antenna system 100 between a plurality of configurations and measures an antenna performance indicator for each configuration to determine the optimum transmission configuration. After measuring antenna performance indicator in a first configuration, the antenna is changed to a second configuration during a reduced data rate transmission. The antenna performance indicator measured in the second configuration and the antenna performance indicator measured in the first configuration are evaluated to determine the optimum transmission antenna configuration.

In the exemplary embodiment, the two configurations include connecting a first configuration where only the first antenna 106 is connected and a second configuration where only the second antenna 108 is connected. The controller 114 provides a control signal to the antenna switch 116 to switch the antennas 106, 108 and change antenna system configuration. The controller 114 manages the antenna system 100 by monitoring the reflection coefficients at each antenna 106, 108 and selecting the antenna 106, 108 that results in the optimum transmission performance. During communication using the first antenna 106, the mismatch detector 110 provides the controller 114 with signals corresponding to the incident power and reflected power at the current antenna 106 allowing the controller 114 to calculate the reflection coefficient ($\rho_1$) for the current antenna. During a reduced data rate transmission, the controller 114 provides a control signal to the antenna switch 116 to connect the second antenna 108 and change the antenna system 100 to the second (alternate) configuration. The signals provided by the mismatch detector 112 are used to determine the reflection coefficient ($\rho_2$) for the alternate antenna 108. The refection coefficients ($\rho_1$, $\rho_2$) are evaluated by the controller 114 to determine which antenna (106, 108) will provide the best transmission performance. The antenna (106, 108) that provides the best transmission performance may not necessarily be the antenna with the lowest reflection coefficient. In the exemplary embodiment, the antenna evaluation includes calculating the differences between the measured reflection coefficient and an optimum reflection coefficient ($\rho_{1\text{-}OPT}$, $\rho_{2\text{-}OPT}$) for each antenna 106, 108 and comparing the differences to determine the antenna (106, 108) that will provide the best transmission performance. In the exemplary embodiment, the optimum reflection coefficients are calibrated by measuring the return loss of the antenna system in free space.

In accordance with the exemplary embodiment, the antenna evaluation procedure is performed during an active call. During a reduced rate reverse link transmission, the second antenna configuration is evaluated to determine whether the first (current) or second (alternate) configuration is the optimum configuration for reverse link (RL) transmission. In the exemplary embodiment, the antenna evaluation procedure is executed during an active voice call and the second configuration is evaluated when the vocoder rate for the current frame is less than the full vocoder rate. Accordingly, the second configuration antenna 108 is checked during times when the transmission vocoder rate is reduced such as when the user is listening to an incoming voice signal or when the user pauses in conversation. The antenna switching management systems and methods, however, may be applied in other situations such as during pauses in file transfers during a data call or otherwise when the transmission rate is reduced. The reduced transmission rate may be a gated mode transmission, where only a portion of the available frames are transmitted resulting in averaged reduced transmission power. Other conditions may be required to be met before the second configuration is evaluated. As explained in further detail below, for example, the output power of the transmitter must be above a maximum threshold before antenna evaluation procedure is executed in the exemplary embodiment. Further, the alternate antenna (108) is not evaluated when reverse link (RL) control signals are transmitted. Examples of other conditions include requiring a minimum received signal strength indicator (RSSI) before performing the evaluation procedure.

Figure 2:
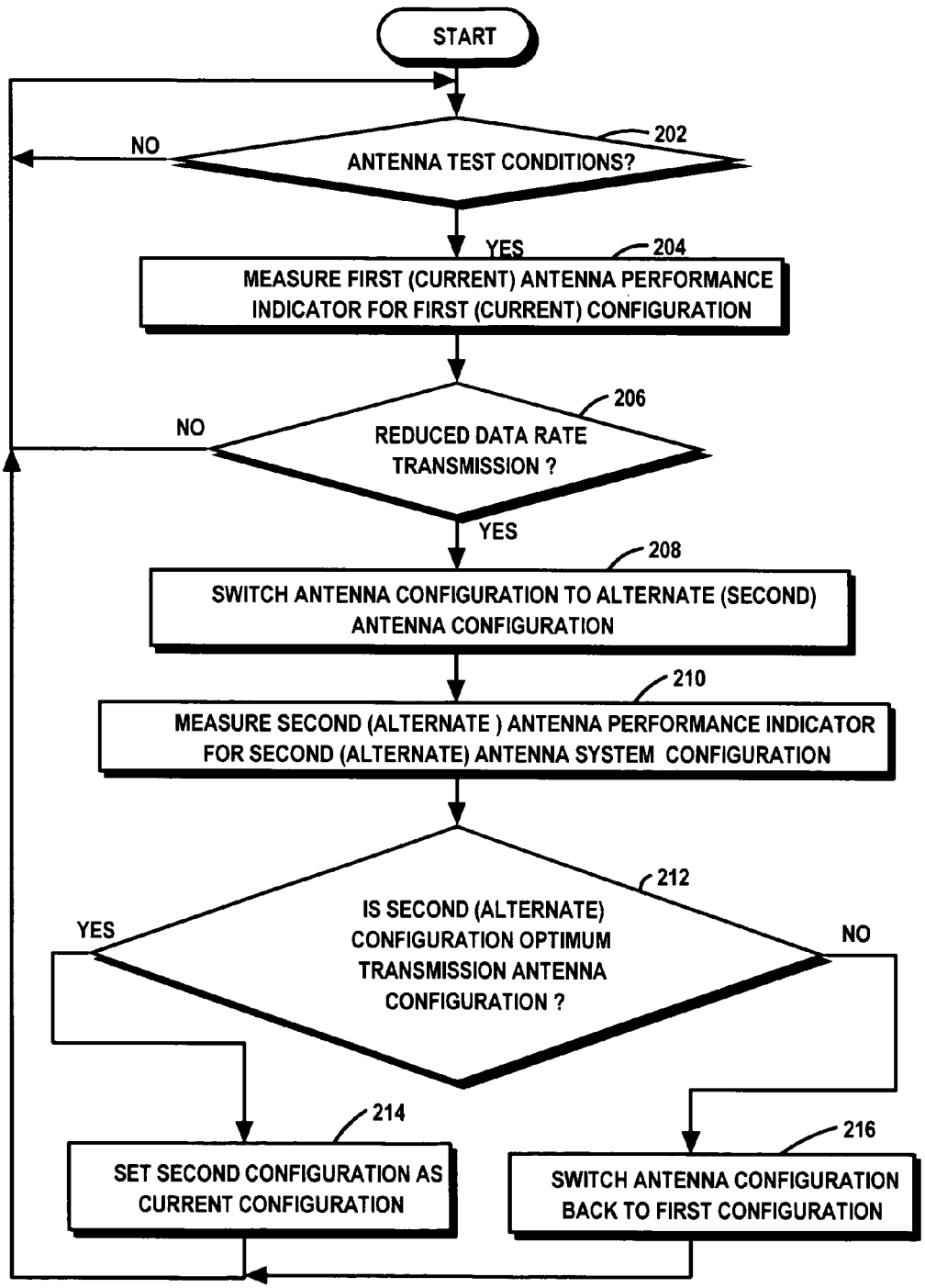
FIG. 2 is a flow chart of a method a managing an antenna system in accordance with the exemplary embodiment of the invention.

FIG. 2 is a flow chart of a method of managing the antenna system 100 in accordance with the exemplary embodiment of the invention. The method may be performed in any wireless communication device having a transmission antenna system 100. In the exemplary embodiment, the method discussed with reference to FIG. 2 is performed in a portable communication device 102 and includes executing software code in the controller 114. As discussed above, the antenna system 100 configurations include connecting one of the antennas 106, 108 to form a first configuration or second configuration. The particular antenna referred to as the first or current antenna and the second or alternate antenna is based on the configuration when the procedure is executed. Accordingly, either the first antenna 106 or the second antenna 108 may be the current antenna. When it is determined that alternate antenna provides better transmission performance, the alternate antenna configuration is connected and becomes the current antenna configuration for the next evaluation. In the discussion below with reference to FIG. 2, the method begins with the first antenna 106 as the current antenna.

At step 202, it is determined whether the conditions are appropriate for evaluating the antenna system 100. The conditions may be based on any number of parameters or priorities and may be established to reduce degraded performance during critical times or when antenna efficiency is not critical and changes in antenna transmission performance will not significantly affect overall communication performance. In the exemplary embodiment, the conditions are based on call status and transmitter output levels. If the conditions are not met, the procedure returns to the start for continued monitoring. If the conditions are met, the method continues at step 204. An exemplary technique of performing step 202 is discussed in further detail with reference to FIG. 3 below.

At step 204, the current antenna performance indicator is measured for the first (current) antenna system 100 configuration. In the exemplary embodiment, the output signals from the mismatch detector 110 are received at the controller 114 and evaluated to determine the reflection coefficient ($\rho_1$). As described above, an example of a suitable technique for determining the reflection coefficient includes measuring the incident voltage at the input of the antenna 106 and reflected voltage at the input of the antenna 106.

At step 206, it is determined whether a reduced rate transmission condition is present. As described below with reference to FIG. 4, the reduced data rate condition evaluation in the exemplary embodiment includes determining whether the vocoder rate is less than the full rate and whether a reverse link (RL) signal is currently transmitted. If the reduced data rate transmission is not present, the method returns to the step 202. In systems not utilizing vocoders, the reduced transmission rate is determined using other parameters. For example, the reduced data rate may be based on a bit rate of a file transfer that is below a threshold. Further, the reduced transmission rate determination may be based on a whether the transmitter is transmitting data in a gated mode.

If the reduced rate condition is met, the method continues at step 208 where the antenna system configuration is changed to the second (alternate) antenna configuration. In the exemplary embodiment, the controller 114 presents a control signal to the antenna switch 116 to switch from the first (current) antenna 106 to the second (alternate) antenna 108. As explained above, the antenna configurations may include configurations other than exclusively connected single antennas in some circumstances.

At step 210, the second antenna performance indicator for the second antenna system configuration is measured. In the exemplary embodiment, the output signals from the mismatch detector 112 corresponding to the second antenna 108 are received and evaluated by the controller 114 to determine the reflection coefficient (P2) for the second antenna 108.

At step 212, the first antenna performance indicator and the second antenna performance indicator are evaluated to determine the optimum transmission antenna configuration. In the exemplary embodiment, the difference ($\rho_{A1}$, $\rho_{A2}$) between the optimum reflection coefficient ($\rho_{1-OPT}$, $\rho_{2-OPT}$) for each antenna 106, 108 and the measured reflection coefficient ($\rho_1$, $\rho_2$) for each antenna is calculated. The optimum reflection coefficients ($\rho_{1-OPT}$, $\rho_{2-OPT}$) are determined and stored in the memory 120 during manufacturing of the portable communication device 102. The optimum reflection coefficients ($\rho_{1-OPT}$, $\rho_{2-OPT}$) are retrieved from memory 120 and used to calculate $\rho_{A1}$ and $\rho_{A2}$. Accordingly, $\rho_{A1}=|\rho_1-\rho_{1-OPT}|$ is calculated for the first antenna 106 and $\rho_{A2}=|\rho_2-\rho_{2-OPT}|$ is calculated for the second antenna 108. In the exemplary embodiment, the antenna with the smaller reflection coefficient difference is determined to provide the optimum transmission antenna performance. If the differences ($\rho_{A1}$, $\rho_{A2}$) are equal, the second (alternate) configuration is determined to be the optimum configuration. If the second (alternate) configuration is determined to be the optimum configuration, the second (alternate) configuration becomes the current configuration for the next evaluation at step 214 and the method returns to step 202. Otherwise, the method continues at step 216 where the antenna system 100 configuration is switched back to the first configuration which remains defined as the current configuration before returning to step 202.

The antenna configuration evaluation may be based on a variety of factors and parameters in addition to reflection coefficients. For example, the antenna performance indicator can be characterized by using the average transmission power of each antenna 106, 108. Further, one or more portions of step 212 may be performed at other times during execution of the method. For example, the difference ($\rho_{A1}$) of the first (current) antenna may be determined after the reflection coefficient ($\rho_1$) is measured for the first antenna but before the second antenna 108 performance indicator is measured.

Figure 3:
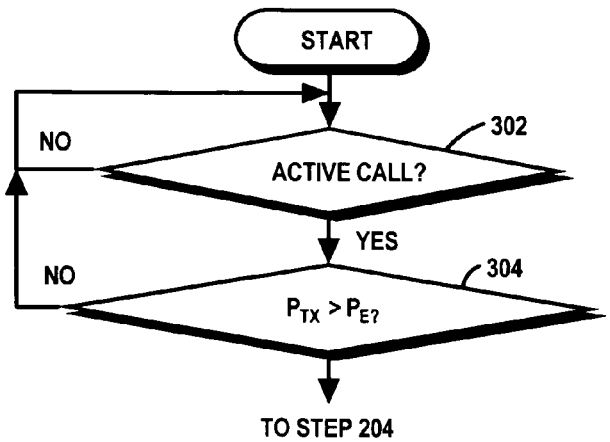
FIG. 3 is a flow chart of an exemplary method of determining if conditions are appropriate for executing the antenna configuration evaluation procedure.

FIG. 3 is a flow chart of an exemplary method of determining if conditions are appropriate for executing the antenna configuration evaluation procedure. Accordingly, steps 302-306 provide an exemplary technique for performing step 202 in FIG. 2.

At step 302, it is determined whether a call is currently active. In the exemplary embodiment, it is determined whether a voice call is active. If a voice call is not active, the procedure continues to monitor the call status at step 302. Otherwise, the procedure continues at step 304.

At step 304, the output power of the transmitter ($P_{TX}$) is evaluated to determine if the transmission power is above an evaluation power threshold ($P_E$). An example of a suitable transmission power threshold is 13 dBm. In the exemplary embodiment, the transmission power is determined based on a status of the Transmit automatic gain control (TX_AGC) circuit used to set the output power signal produced at the input of the antennas 106, 108. If the output power is above the threshold, the procedure continues at step 204. Otherwise, the procedure returns to step 302. Other thresholds such as the receive power, received signal strength indicator (RSSI), pilot Ec/Io and frame error rate may be used in some circumstances. The threshold is selected to avoid inefficient or unnecessary execution of the antenna configuration evaluation procedure. In CDMA systems, the RSSI measures the received pilot power at the portable communication device. Where the RSSI is relatively high, it is unlikely that selecting a different antenna will result in improved performance or efficiency. An example of a suitable RSSI threshold is −85 dBm. Accordingly, if RSSI is used as a threshold, the procedure continues at step 204 if the RSSI is below the threshold and returns to step 302, otherwise. In some situations, a combination of parameters may be used to execute the antenna configuration evaluation procedure. For example, a combination of RSSI and transmitter output power parameters may be used to determine the whether the antenna configuration should be evaluated.

Figure 4:
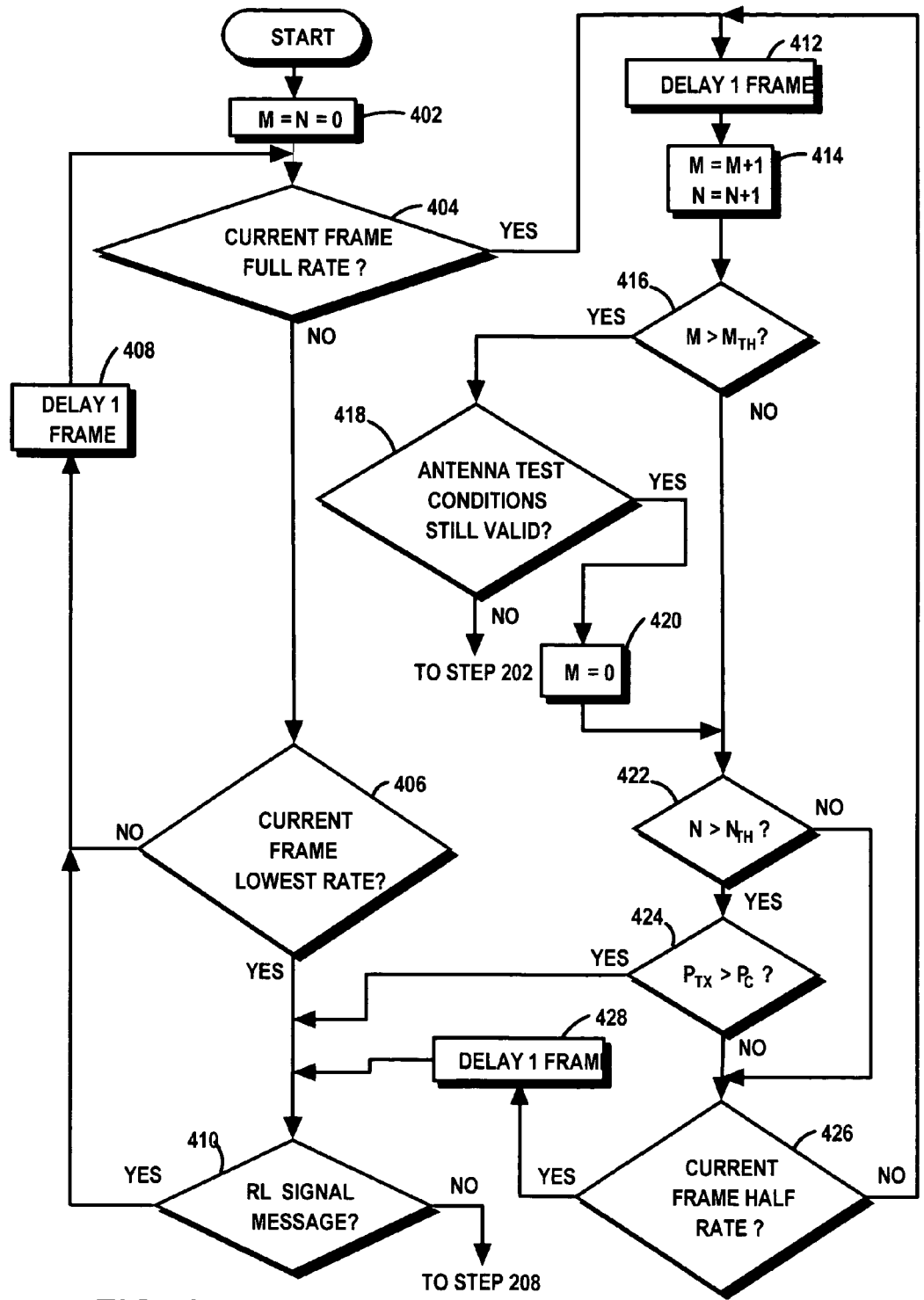
FIG. 4 is a flow chart of an exemplary method for determining if a reduced rate transmission condition has been met.

FIG. 4 is a flow chart of an exemplary method for determining if a reduced rate transmission condition has been met. Accordingly, steps 402 through 424 provide an exemplary technique for performing step 206 of FIG. 2.

At step 402, two counters are reset. A counter M and a counter N are set to zero. As described below, the counters provide a mechanism to monitor condition changes and extreme conditions where it is beneficial to monitor the second antenna during a full rate transmission.

At step 404, it is determined whether the current frame is a full rate frame. In the exemplary embodiment, the controller 114 determines if the vocoder rate is at "full". As is known, vocoders, such as enhanced variable rate codecs (EVRC), have a full rate that is required to transmit voice coded signal and one or more reduced or partial rates. One such situation includes a full rate, a half rate, and a lowest rate. The lowest rate in many vocoders and standards is an eighth rate. When there are pauses in a conversation, the vocoder will transition to the lowest rate. Some more recent standards have defined the lowest rate at a rate other than an eighth rate. If the current frame rate is a full rate, the procedure continues at step 412. Otherwise, the method continues at step 406.

At step 406, it is determined if the current frame rate is the lowest rate. In the exemplary embodiment, the controller 114 determines if the vocoder rate is set to the low rate. If the current rate is the lowest rate, the procedure continues at step 410. Otherwise, the procedure continues at step 408.

At step 408, a delay of one frame is executed before returning to step 402. The delay provides a mechanism for determining the data rate of the next frame. At the "NO" output of step 406, the vocoder rate is at half rate since the rate is not at the full rate or at the lowest rate. Since the half rate is transitional rate, the next frame may be full rate or lowest rate. The delay allows the next frame to be evaluated. In the exemplary embodiment a single frame delay is adequate since the rate can only be at half rate for a single frame.

At step 410, it is determined whether a reverse link signaling message is currently being transmitted from the portable communication device 102. If a RL signaling message is currently being transmitted, the procedure continues at step 408. Otherwise the procedure continues at step 208

At step 412, a one frame delay is executed before the method proceeds to step 414. As discussed below, the data rate is checked at step 426 to determine if it has changed to half rate. The one frame delay allows the rate to possibly change to half rate at the next frame.

At step 414, the counters are incremented by one. Both the M counter and the N counter are incremented. Although both counters track the number of times the method loops through step 422, the counters are evaluated based on different thresholds in order to determine different conditions.

At step 416, it is determined whether the M counter has exceeded an M counter threshold ($M_{TH}$). The M counter threshold and step 418 provide a mechanism for exiting step 206 when the antenna conditions have changed. Therefore, when the number of times through step 412 has exceeded the M counter threshold, the procedure continues at step 418 where it is determined if the antenna test conditions are still valid. If the conditions have changed, and the test conditions are no longer valid, the method returns to step 202 to continue monitoring the antenna conditions. If the antenna test conditions are still valid, the procedure resets the M counter at step 420 and continues at step 422.

At step 422, it is determined whether the N counter has exceeded the N counter threshold ($N_{TH}$). The N counter provides a mechanism for evaluating the second antenna 108 when the data rate has been at a high rate for significant number of frames and where the power level has exceeded a critical level. Such a situation may occur in a voice call where the user continuously speaks for a significant time and the portable communication device is in low coverage area of a cell. In a data call, the situation may arise where a continuous stream of data is transmitted from the portable communication device. If the N counter threshold is exceeded, the transmitter output power level is evaluated at step 424. Otherwise, the procedure continues at step 426.

At step 424, it is determined if the transmitter output power ($P_{TX}$) is greater than critical output power threshold ($P_c$). The critical output power threshold ($P_c$) is greater than the evaluation power level and reflects a transmitter output power level that allows the antenna system to evaluate the second antenna at a full rate when the N counter is exceeded. If the transmitter output power is greater than $P_c$, the method continues at step 410. Otherwise, the method continues at step 426. In some circumstances, RSSI may be monitored to determine if the second antenna should be evaluated in the full rate.

At step 426, it is determined if the current frame rate is the half rate. In the exemplary embodiment, the controller 114 determines if the vocoder rate is set to the half rate. If the current rate is the half rate, the procedure continues at step 428 where a one frame delay is executed before continuing at step 410. Otherwise, the procedure returns to step 412.

Therefore, in the exemplary embodiment, a first (current) reflection coefficient for the first (current) antenna 106 is measured and a second (alternate) reflection coefficient is measured for the second (alternate) antenna 108 during a reduced rate transmission. The reflection coefficients are evaluated to identify the antenna that will provide the highest performance. If the first (current) antenna 106 provides better transmission performance, the antenna system 100 is configured to reconnect the first antenna 106. Otherwise, the second (alternate) antenna 108 is used for transmission and the second antenna becomes the "current" antenna.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method of managing a transmission antenna system, the method comprising:
   measuring a first antenna performance indicator of a transmission antenna system in a first transmission antenna system configuration;
   configuring the transmission antenna system to a second transmission antenna system configuration in response to determining current transmission through the transmission antenna system is a reduced data rate transmission;
   measuring a second antenna performance indicator of the transmission antenna in the second configuration; and
   selecting a preferred antenna system configuration from the first and second antenna system configurations based on the first antenna performance indicator and based on the second antenna performance indicator.

2. The method of claim 1, further comprising:
   determining that the current transmission data rate is the reduced data rate less than a full transmission data rate.

3. The method of claim 2, wherein the configuring comprises:
   disconnecting a first antenna and connecting a second antenna.

4. The method of claim 3, wherein the measuring the first antenna performance indicator comprises measuring a first antenna reflection coefficient at a first antenna input of the first antenna; and
   wherein the measuring the second antenna performance indicator comprises measuring a second antenna reflection coefficient at a second antenna input of the second antenna.

5. The method of claim 4, wherein the selecting comprises:
   selecting a preferred antenna based on the first antenna reflection coefficient and the second antenna reflection coefficient.

6. The method of claim 5, wherein the selecting further comprises:
   determining a first reflection coefficient difference between the first antenna reflection coefficient and a first antenna optimum reflection coefficient;
   determining a second reflection coefficient difference between the second antenna reflection coefficient and a second antenna optimum reflection coefficient; and
   disconnecting the second antenna and reconnecting the first antenna if the first reflection coefficient difference is less than the second reflection coefficient difference.

7. The method of claim 6, wherein the selecting further comprises:
   utilizing the second antenna for transmission if the second reflection coefficient difference is less than or equal to the first reflection coefficient difference.

8. The method of claim 2, wherein the configuring the transmission antenna system to the second transmission antenna system configuration comprises configuring the transmission antenna system during an active call.

9. The method of claim 8, wherein configuring the antenna system during an active call comprises configuring the transmission antenna system during an active voice call.

10. The method of claim 8, wherein configuring the transmission antenna system during an active call comprises configuring the transmission antenna system during a gated mode.

11. The method of claim 9, wherein the configuring the transmission antenna system further comprises configuring the transmission antenna system to the second transmission antenna system configuration if a vocoder rate is a reduced vocoder rate less than a full vocoder rate.

12. A portable communication device comprising:
   a transmission antenna system configurable to a plurality of antenna system configurations comprising a first transmission antenna system and a second transmission antenna system configuration;
   a controller configured to provide a control signal to change the configuration of the transmission antenna system from the first transmission antenna system configuration to the second transmission antenna system configuration in response to determining that a transmission through the transmission antenna system is a reduced rate transmission and configured to select a preferred antenna system configuration from the plurality of antenna system configurations based on a first antenna performance indicator measured when the transmission antenna system is in the first transmission antenna system configuration and based on a second antenna performance indicator measured when the transmission antenna system is in the second transmission antenna system configuration.

13. The portable communication device of claim 12, further comprising:
   an antenna performance detector configured to measure the first antenna performance indicator when the transmission antenna system is in the first transmission antenna system configuration and measure the second antenna performance indicator when the transmission antenna system is in the second transmission antenna system configuration.

14. The portable communication device of claim 13, further comprising:
   an antenna switch responsive to the control signal to configure the transmission antenna system to the second transmission antenna system configuration.

15. The portable communication device of claim 14, wherein the antenna switch is configured to disconnect a first antenna and connect a second antenna in response to the control signal.

16. The portable communication device of claim 15, wherein the antenna performance detector comprises:
   a first mismatch detector configured to measure a first antenna reflection coefficient at a first antenna input of the first antenna; and
   a second mismatch detector configured to measure a second antenna reflection coefficient at a second antenna input of the second antenna.

17. The portable communication device of claim 16, wherein the controller is configured to select a preferred antenna based on the first antenna reflection coefficient and the second antenna reflection coefficient.

18. The portable communication device of claim 17, wherein the controller is further configured to:
   determine a first reflection coefficient difference between the first antenna reflection coefficient and a first antenna optimum reflection coefficient;

determine a second reflection coefficient difference between the second antenna reflection coefficient and a second antenna optimum reflection coefficient; and generate the control signal to disconnect the second antenna and reconnect the first antenna if the first reflection coefficient difference is less than the second reflection coefficient difference.

19. The portable communication device of claim 14, wherein the controller is configured to configure the transmission antenna system to the second transmission antenna system configuration during an active call.

20. The portable communication device of claim 18, wherein the controller is configured to configure the transmission antenna system to the second transmission antenna system configuration if a current vocoder rate is a reduced vocoder rate less than a full vocoder rate.

21. The portable communication device of claim 18, wherein the controller is configured to configure the transmission antenna system during a gated mode.

22. A method of managing a transmission antenna system within a portable communication device, the method comprising:

measuring a first antenna reflection coefficient at a first antenna input of a first antenna;

determining a vocoder rate is less than a full vocoder rate during a voice call;

disconnecting the first antenna and connecting a second antenna during the voice call in response to determining the vocoder rate is less than the full vocoder rate;

measuring a second antenna reflection coefficient at a second antenna input of the second antenna;

determining a first reflection coefficient difference between the first antenna reflection coefficient and a first antenna optimum reflection coefficient;

determining a second reflection coefficient difference between the second antenna reflection coefficient and a second antenna optimum reflection coefficient; and disconnecting the second antenna and reconnecting the first antenna if the first reflection coefficient difference is less than the second reflection coefficient difference.

\* \* \* \* \*